March 29, 1960  C W. MUSSER ET AL  2,930,254
HARMONIC GEARING WITH EXTENDED CONTACT
Filed Feb. 26, 1958  2 Sheets-Sheet 1
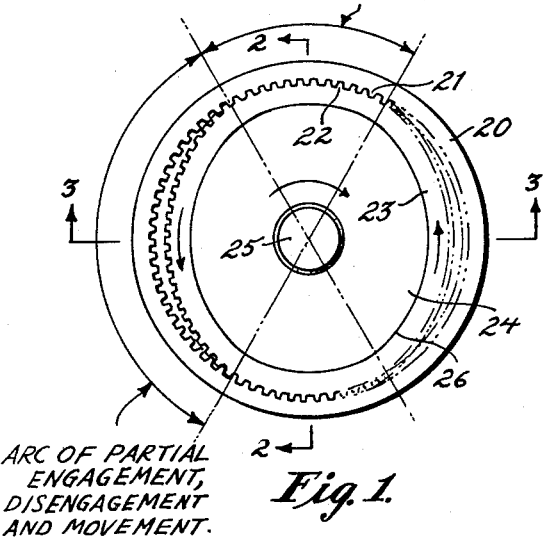
Fig. 1.
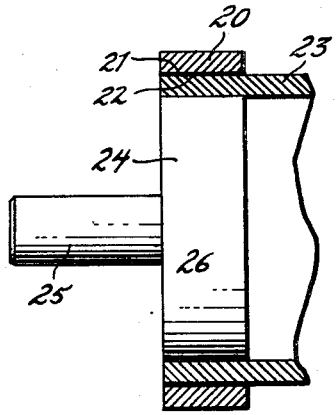
Fig. 2.
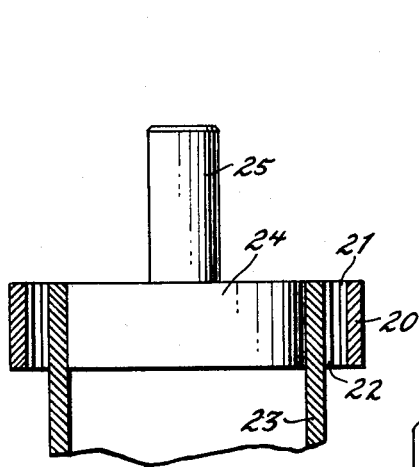
Fig. 3.
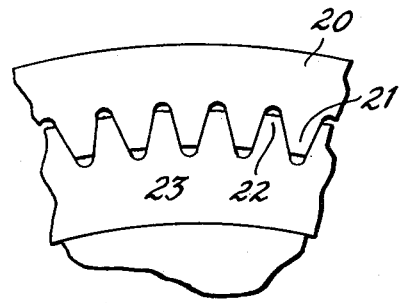
Fig. 4.
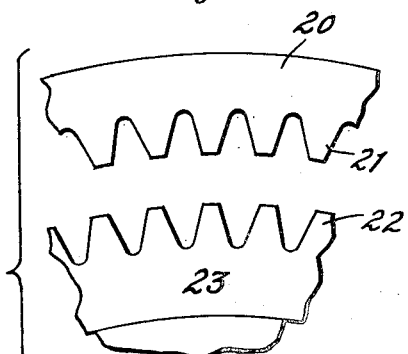
Fig. 5.
INVENTORS
C. WALTON MUSSER
JOHN H. CARLSON
BY
ATTORNEYS

SHAPE OF WAVE GENERATOR FOR SINGLE TOOTH CONTACT

SHAPE OF WAVE GENERATOR FOR EXTENDED CONTACT

United States Patent Office 2,930,254
Patented Mar. 29, 1960

2,930,254

HARMONIC GEARING WITH EXTENDED CONTACT

C Walton Musser and John H. Carlson, Beverly, Mass., assignors to United Shoe Machinery Corporation, Boston, Mass., a corporation of New Jersey Application February 26, 1958, Serial No. 717,708

9 Claims. (Cl. 74—640)

The present invention relates to harmonic gearing systems of the type disclosed in C. Walton Musser's United States patent application for Strain Wave Gearing, Serial No. 495,479, filed March 21, 1955, now United States Patent No. 2,906,143, granted September 29, 1959.

A purpose of the invention is to increase the large torque-carrying capabilities of harmonic gearing by increasing the contact area of teeth in mating engagement by changing the contour of the wave generator.

A further purpose is to conform the lobes of the wave generator to the arc of a circle, preferably the major axis arc of the wave generator, and to extend these relatively flattened lobes laterally over a considerable arc, preferably of the order of 60 degrees at each lobe.

A further purpose is to make the lobes of the wave generator concentric with the curvature of the ring gear.

A further purpose is to employ a wave generator with a radius which varies as a sine wave except at the peaks and which is relatively flattened to conform preferably to a circular arc at the peaks.

Further purposes appear in the specification and in the claims.

In the drawings I have chosen to illustrate one only of the numerous embodiments in which my invention may appear, selecting the form shown from the standpoint of convenience, in illustration of the principles involved.

Figure 1 is a diagrammatic end elevation of a gearing system in accordance with the invention.

Figure 2 is a section of Figure 1 on the line 2—2.

Figure 3 is a section of Figure 1 on the line 3—3.

Figure 4 is an enlargement of Figure 1 showing the portion at which the teeth are in engagement.

Figure 5 is an enlargement of Figure 1 showing the portion at which the teeth are out of engagement.

Figure 6:
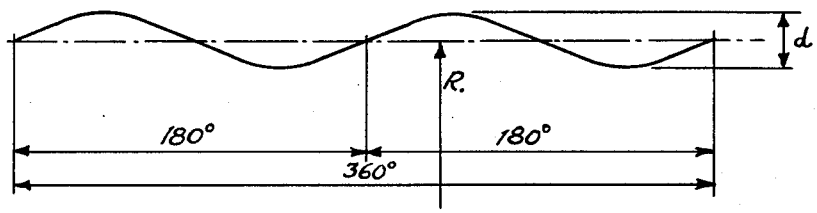
Figures 6 and 7 are diagrams of wave generator contours useful in explaining the invention.

In the development of harmonic gearing by C. Walton Musser, as shown for example in the patent application above referred to, the strain inducer has generally been of the character of an elliptoidal surface. In some instances prestress has been used to increase the intimacy of tooth contact. While the torque-carrying capabilities of harmonic gearing are relatively huge compared to ordinary gearing, there are cases in which it is desirable to further increase the torque-carrying capabilities and the present invention is particularly useful in such cases.

We have discovered that by departing entirely from the elliptoidal form and using preferably a generally circular form at the lobes of the wave generator, it is possible to have as much as 120 degrees tooth engagement using two lobes, assuring that approximately one-third of all the teeth are in contact, so that the torque-carrying capacity can readily be made to exceed that of other parts of the equipment such as the drive shafts. The principles of the invention can be applied to a device having any desired number of lobes, whether one, two, three or more.

In the prior development of harmonic gearing, the contact area has been the peak of the wave in the internal form and the valley of the wave in the inverted form. When teeth are involved and the wave generator follows a sine wave, the area of contact under moderate loading is of the order of 10 to 15 percent of the total teeth of the gears.

In accordance with the present invention, the peak or valley of the sine or harmonic wave (depending upon whether we are concerned with the internal form or the inverted form) is desirably increased in length. In one embodiment, at the point where the wave becomes tangent to the pitch circle of the mating ring gear, the lobe of the wave generator is extended along the pitch circle of the ring gear. The length of this extended contact is only limited by stress and tooth size considerations. Since any extended contact reduces the angular distance available for the deflection of the flexible gear, it increases the stress for a given tooth size.

In the preferred form, the wave form produced by the wave generator is a harmonic or sine wave up to the peak or valley, where it becomes tangent with the ring gear pitch circle. Any circular arc portion which joins the peaks or valleys shortens the harmonic wave portion since the total is of course 360 degrees. However, in large gears or in gears where the deflection is small, this is permissible.

In the drawings we illustrate a ring gear 20 suitably of circular form and connected to any desired shaft and turning on any desired bearing. The ring gear has a set of internal teeth 21 of suitable tooth form which at certain points engage external teeth 22 of the same tooth form on a flexible gear 23 which is connected to any suitable shaft or the like as desired, and mounted on any suitable bearings as required.

The question as to whether the ring gear is internal and the flexible gear is external or the ring gear is external and the flexible gear is internal is unimportant in the present invention. The side of the flexible gear remote from its teeth is engaged and deformed by a cam-like wave generator 24, suitably mounted and turning on a shaft 25.

The exterior countour 26 of the wave generator engages the inside of the flexible gear in the form shown.

Figure 7:
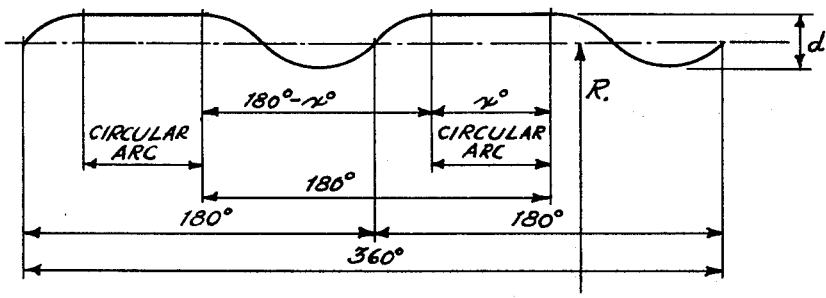

If, for example, we employ a system having two lobes on the wave generator, at the peak of each lobe or where it is tangent to the pitch circle of the mating ring gear, the elliptoidal curve as illustrated in Figure 6 and used in the form of the Musser application above referred to, is eliminated and instead the lobes are flattened or extended laterally. As shown in Figure 7, a circular arc of X degrees is provided at the peak of the lobe, suitably having a radius equal to one-half the major axis. In the preferred embodiment, the circular arc at which the pitch lines of the two gears are tangent, will be 60 degrees in length. This shortens the harmonic wave portion of each of the waves by 60 degrees. There will now be 120 degrees of fully intermeshed teeth and 36 to 54 degrees of partially intermeshed teeth. In this way, we have been able to increase the tooth contact to nearly 50 percent. The wave portion, or the portion where deflection $d$ occurs, has been decreased from 180 degrees to 120 degrees. As a consequence the stresses caused by wave generation in a two lobe form are substantially as great as those in a three lobe wave generator using the principles employed in previous harmonic gearing for the same deflection.

In accordance with the present invention the tooth contact area is extended by altering the shape of the wave at the tooth contact area. The wave does not have to be continuous or symmetrical.

This change in form of the wave generator changes the basic gear data. Thus with two arcs of 60 degrees of full contact, the tooth angle and the wave deflection should be calculated as if the device were a three lobe wave generator. The initial unstressed flexible gear, however, has only two teeth (or a multiple) less than the ring gear (more if it is external) since there are only two areas of contact. If there were three lobes, then the difference in number of teeth would be three (or a multiple) in each case.

The gear ratio would be increased by $$\frac{3}{2}$$

the difference in the tooth differential.

The following data are of interest as applying to the gearing system of the present invention:

$a$—Addendum — $7d/16$
$b$—Dedendum — $9d/16$
$d$—Height of wave or total radial deflection.
$D_R$—Pitch diameter of ring gear — $N_R/P$
$D_E$—Pitch diameter of flexible gear — $N_E/P$
$D_D$—Pitch diameter of driven gear — $N_D/P$
$n$—Number of lobes on strain inducer=number of places of tooth engagement.
$N_R$—Number of teeth in ring gear — $D_R/P$
$N_D$—Number of teeth in driven gear — $D_D/P$
$N_E$—Number of teeth in flexible gear — $D_E/P$
$p$—Circular pitch — $\pi/P$
$P$—Diametral pitch — $\pi/p$
$R$—Gear ratio — $N_D/n$
$\phi$—Pressure angle—approximately $\dfrac{\text{Tan}^{-1} 1.15(360° - \Theta)}{360° \times n}$
$\Theta$—Angle of extended contact (total).

In view of our invention and disclosure variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. In a gearing system, a first gear, a second flexible gear in telescoping relating with respect to the first gear having cooperating teeth of the same tooth form, and a wave generator engaging and deflecting the flexible gear on the side remote from the teeth, the wave generator having a generally circular form with at least one arcuate lobe section the ends of which are connected to a portion having the contour of a sine wave superimposed on a circle.

2. In a gearing system, a first gear, a second flexible gear in telescoping relation with respect to the first gear having cooperating teeth of the same tooth form, and a wave generator engaging the flexible gear on the side remote from the teeth, having on a portion of its periphery a sine wave contour interspersed by lobes formed by circular arcs tangent to and connecting the sine wave contour at its greatest distance from the center, the teeth of the two sets differing in number by an amount which conforms to the number of mating areas of the sets of teeth or a multiple, and there being nonmating areas interposed between the mating areas.

3. A gearing system of claim 2, in which the curvature of the lobes and the curvature of the ring gear have a common center.

4. A gearing system of claim 2, in which each lobe extends over at least 60 degrees of arc in which the teeth are held in mating relation.

5. In a gearing system, a ring gear of circular contour, a flexible gear, the flexible gear and the ring gear having cooperating teeth of the same tooth form, and the teeth of the flexible gear and the ring gear engaging at a plurality of areas with intermediate non-mating areas, and a wave generator engaging the side of the flexible gear remote from the teeth and deforming the teeth into engagement, the wave generator having lobes adjacent areas of tooth engagement which conform to the arc of a circle and having between the lobes at the points where the teeth are non-mating a reduced diameter as compared with the lobes.

6. A gearing system of claim 3, in which the radius of the wave generator at the areas of reduced diameter varies according to a sine wave function.

7. In a gearing system, a pair of cooperating gears having relatively internal and external teeth of the same tooth form, one of the gears being flexible, and the teeth mating at a plurality of spaced areas with intermediate non-mating areas, the tooth sets having a difference in number of teeth which corresponds with the number of mating areas or a multiple thereof, and a wave generator engaging the side of the flexible gear remote from the teeth and deforming the flexible gear into mating relation at the mating areas, the wave generator having extended relatively flattened peaks and intermediate portions of reduced diameter, the teeth of the respective sets being in engagement over at least 100 degrees of the circumference.

8. A gearing system of claim 7, in which the wave generator conforms to a sine wave with the maximum points of inflection flattened.

9. In a gearing system, a first gear, a second flexible gear, the gears being one within another, and having teeth which are adapted to interengage one with another, and means having at least two spaced lobes for deflecting the flexible gear into engagement with the first gear and progressing this tooth engagement so as to cause relative movement of the two gears, the flexible gear at spaced positions produced by the lobes having its pitch line in coincidence with the pitch line of the first gear over an appreciable arc of the circumference and the flexible gear at other positions being radially spaced from the first gear.

No references cited.